Patented Feb. 15, 1938

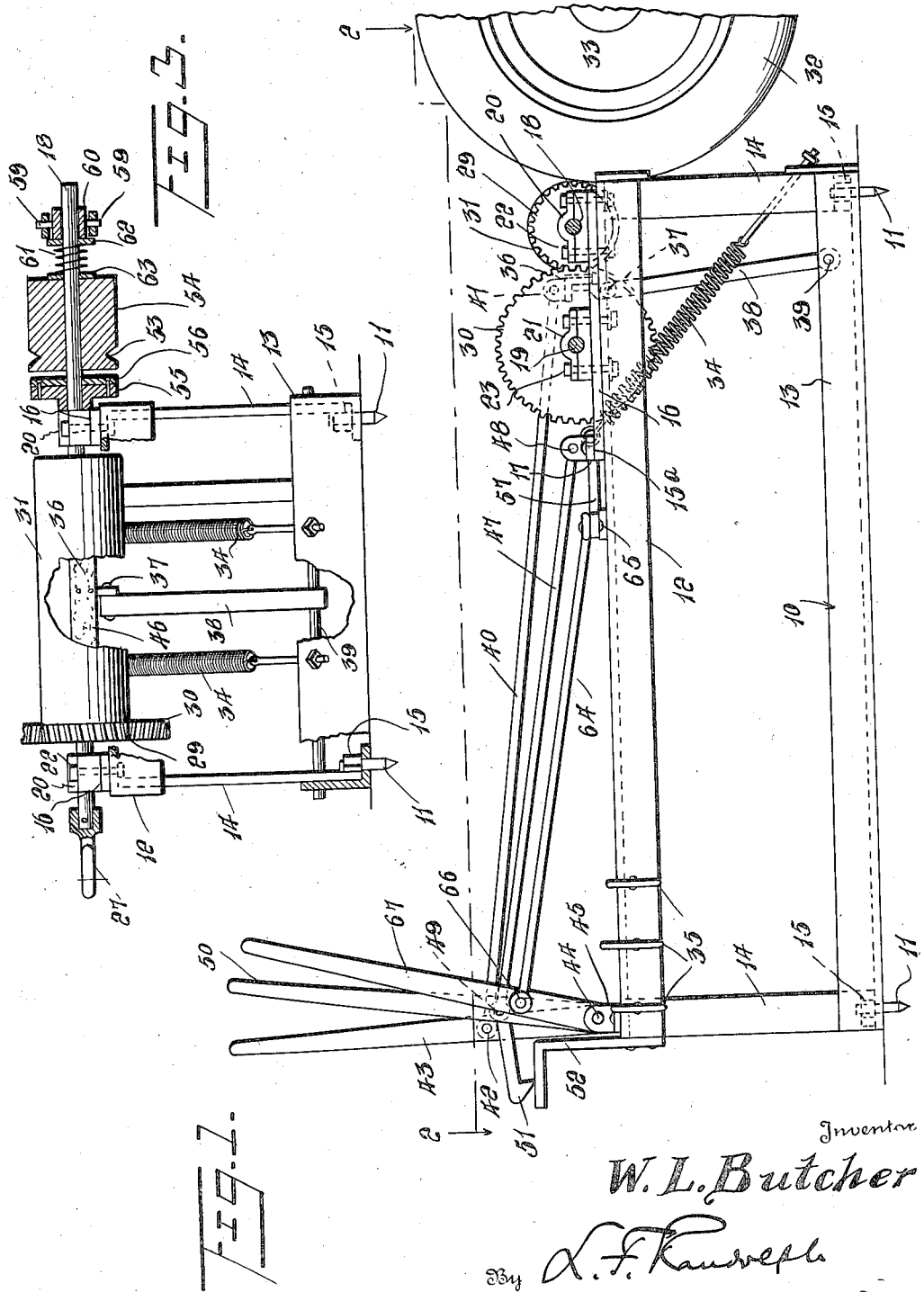

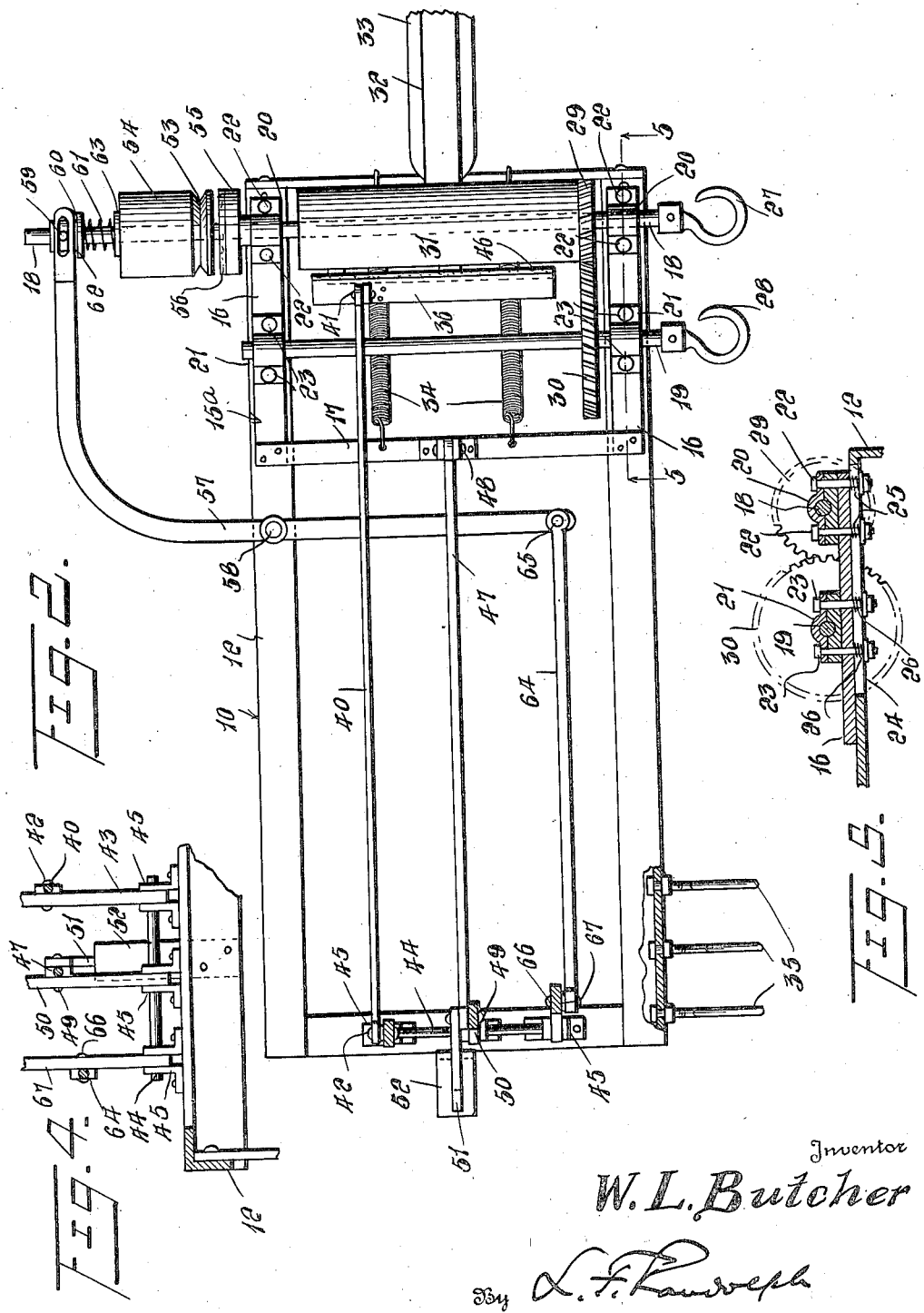

2,108,704

UNITED STATES PATENT OFFICE 2,108,704

ROPE MAKING MACHINE

William L. Butcher, Decorah, Iowa

Application March 25, 1937, Serial No. 133,049

4 Claims. (Cl. 117—7)

This invention relates to a machine for making rope and it aims to provide an exceedingly simple, inexpensive, durable and efficient mechanism, capable of being built into a portable construction and of being operated from an automobile wheel or other source of power.

The more specific objects and advantages will become apparent from a consideration of the description following taken in connection with accompanying drawings illustrating an operative embodiment.

In said drawings:—

Figure 1 is a view of my improvements in side elevation;

Figure 2 is a plan view, taken on the line 2—2 of Figure 1;

Figure 3 is a rear end view, partly in section;

Figure 4 is a detail transverse section showing the mounting of the various control levers, and Figure 5 is a detail longitudinal sectional view taken on the line 5—5 of Figure 2.

Referring specifically to the drawings wherein like reference characters designate like or similar parts, 10 designates a suitable frame, preferably made of metal although capable of manufacture from any suitable material. Such frame at the four lower corners thereof is provided with stakes 11 adapted to enter the ground and anchor the frame against accidental movement. Such frame, for instance, employs an upper rectangular portion 12 and a lower rectangular portion 13, each made of angle material and connected by means of corner posts or uprights 14 which may have feet 15 resting on the horizontal web of the lower section 13 and through which the stakes 11 pass, thus aiding in securing the posts and lower section together, and generally rigidifying the structure.

Resting on and slidable longitudinally of the upper section 12 is a bed frame or plate 15ª, for instance U-shape in plan, having side members 16 and a cross member 17 suitably connected thereto. Parallel shafts 18 and 19 are journaled on the bed frame 17, being mounted in suitable bearings 20 and 21 thereon, the sections or parts thereof being secured together by bolts 22 and 23 which extend through elongated slots 24 in the adjacent members of the upper section 12 and such bolts 22 and 23 preferably having coil springs 25 and 26, surrounding the same and under appropriate tension to hold the parts operatively together, yet permitting sliding movement of the auxiliary frame or bed 15ª. A strand-winding hook 27 is detachably carried by and rotatable with the shaft 18 and a similar hook 28 is detachably carried by and rotatable with the shaft 19 for winding full rope. Said shafts 18 and 19 have gears 29 and 30 keyed thereto and enmeshed.

Keyed to the shaft 18, is a pulley or drum body 31 of wood or any other desired material, with which a tire 32 on a wheel 33 is adapted to contact, so as to drive the same, the wheel and tire being representative of a rear or drive wheel and tire of an automobile or self-propelled vehicle, it being realized that the vehicle is jacked or the tire elevated above the ground when engaged with the drum 31.

A pair of contractile coil springs 34 are connected to the cross bar 17 and also to an element of the lower frame section 13. As a result, when the tire 32 engages the drum 31, frame 17 may slide slightly so as to tension the springs 34 and thereby maintain an effective frictional grip or driving engagement between the drum 31 and the tire 32.

In operating the machine, the automobile or vehicle of which wheel 33 forms a part, is driven at a rate corresponding to fifteen to twenty miles per hour. The material such as binder twine or any other rope material, for instance manila hemp, sisal, canvas, cotton, window sash cord, gunny sack or burlap is attached to the hook 27 and since the same is revolving, the material makes a tight strand. Three or four strands or in fact any number, may be made in this manner whereupon they are all placed together and connected to hook 28, which rotates in an opposite direction to the hook 27 because of the gearing, and which also operates at less speed since the gear 30 is larger than the gear 29, the hook 28 through its rotation serving to twist the strands into rope. The strands, rope or the like may be supported on hooks such as 35 attached to a convenient part of the machine.

In order to prevent unwinding of the strands from the hook 27, when the same is disengaged by the drive wheel and tire 33 and 32, a brake shoe 36 may be applied against the same. This brake shoe is pivotally connected at 37 to links 38, in turn pivoted at 39 to the lower section 13. A rod 40 is pivoted to the brake shoe 36 at 41 and is pivoted at 42 to a lever 43, journaled on a rod 44 mounted in suitable brackets 45 on the upper frame section 12. Such brake shoe 36 preferably has a friction lining at 46. At desired times, when the hook 27 should remain stationary, the lever 43 may be pressed forwardly toward the hook 27, thereby causing the brake shoe 36 at its lining to engage the drum 31 and hold the same and hook 27 against rotation.

The cross bar 17 of the bed or auxiliary frame 15a has a rod 47 pivoted thereto at 48 and in turn pivoted at 49 to a lever 50 also journaled on the aforesaid rod 44. A latch 51 is pivoted to lever 50 by the pin 49 and is adapted to co-act with a keeper 52 fastened to the upper frame section 12.

It will be realized that through the rearward movement of the lever 50, rod 47 will pull the frame 17 rearwardly and accordingly the drum 31 out of contact with the driving tire 32, as is desirable, when applying or removing a strand with respect to the hook 27 or attaching or detaching rope from the hook 28.

It is obvious that the shaft 18 may be driven in any suitable manner and other than by means of the tire 32 or the like. For instance, the shaft 18 may be driven through the medium of a V-belt or equivalent, engaging a groove 53 in a pulley 54, loose on the shaft 18. Co-acting with the pulley 54 is a clutch disk 55 rigid on the shaft 18 and having a friction facing at 56 for engagement by the adjacent end of the pulley. Normally the pulley is disengaged from the facing 56. In order to engage the pulley 54 with the clutch head 55, when the pulley 54 is driven, a lever 57 is pivoted at 58 to the upper frame section 12 and it has a pin and elongated slot connection at 59 with a collar 60 slidable on the shaft 18, a coil spring 61 being interposed between washers 62 and 63, and surrounding the shaft 18. Lever 57 is adapted to be rocked to press the spring 61 against the pulley 54 and thereby move the latter to clutched engagement with the facing 56. To this end, lever 57 has a rod 64 pivoted thereto at 65, which rod at 66 is pivoted to a hand lever 67 pivoted to the aforesaid rod 44.

When it is desired to latch the drum 31 out of driving relation with the tire 32, the lever 50 is pulled rearwardly until the latch 51, by gravity, falls into detaining engagement with the keeper 52.

Various changes may be resorted to provided they fall within the spirit and scope of the invention.

I claim as my invention:—

1. A machine of the class described provided with twisting hooks, shafts operating said hooks, means to operate one of the shafts, gearing to drive one shaft from the other and in the opposite direction, one of said shafts having a driving drum thereon for frictional contact with a driving wheel, and brake means co-acting with the drum.

2. A machine of the class described provided with twisting hooks, shafts operating said hooks, means to operate one of the shafts, gearing to drive one shaft from the other and in the opposite direction, a frame mounting said shafts, and spring means against the tension of which said frame is slidable.

3. A machine of the class described provided with twisting hooks, shafts operating said hooks, means to operate one of the shafts, gearing to drive one shaft from the other and in the opposite direction, a frame mounting said shafts, spring means against the tension of which said frame is slidable, bearings for the shafts on the frame, fastening elements for the parts of said bearings, and a supporting frame for the first mentioned frame having elongated slots in which said fastening elements extend.

4. A machine of the class described provided with twisting hooks, shafts operating said hooks, means to operate one of the shafts, gearing to drive one shaft from the other and in the opposite direction, a frame mounting said shafts, spring means against the tension of which said frame is slidable, bearings for the shafts on the frame, fastening elements for the parts of said bearings, a supporting frame for the first mentioned frame having elongated slots in which said fastening elements extend, and latch means to secure the first mentioned frame in retracted position operating automatically as the first mentioned frame is retracted.

WILLIAM L. BUTCHER.